US010304137B1

(12) United States Patent
Genser et al.

(10) Patent No.: US 10,304,137 B1
(45) Date of Patent: May 28, 2019

(54) AUTOMATED DAMAGE ASSESSMENT AND CLAIMS PROCESSING

(71) Applicant: Allstate Insurance Company, Northbrook, IL (US)

(72) Inventors: Danuta Genser, Naperville, IL (US); Devbratt Harlalka, Champaign, IL (US); Rohit Garg, Champaign, IL (US); Gaurang Katyal, Champaign, IL (US)

(73) Assignee: Allstate Insurance Company, Northbrook, IL (US)

( * ) Notice: Subject to any disclaimer, the term of this patent is extended or adjusted under 35 U.S.C. 154(b) by 779 days.

(21) Appl. No.: 13/728,539

(22) Filed: Dec. 27, 2012

(51) Int. Cl.
*H04N 7/18* (2006.01)
*G06Q 40/08* (2012.01)

(52) U.S. Cl.
CPC .............. *G06Q 40/08* (2013.01); *H04N 7/181* (2013.01)

(58) Field of Classification Search
CPC ............................. H04N 7/181; G06Q 40/08
USPC ............................................. 348/159; 705/4
See application file for complete search history.

(56) References Cited

U.S. PATENT DOCUMENTS

| 3,308,845 A | 3/1967 | Bellas |
| 3,675,800 A | 7/1972 | Weyant et al. |
| 4,569,531 A | 2/1986 | Beadle |
| 4,981,318 A | 1/1991 | Doane et al. |
| 5,317,503 A * | 5/1994 | Inoue ................. G06Q 10/0875 700/90 |
| 5,343,628 A | 9/1994 | Ham |
| 5,392,388 A | 2/1995 | Gibson |
| 5,657,233 A | 8/1997 | Cherrington et al. |
| 5,673,025 A * | 9/1997 | Refugio .............. G01M 3/3245 340/603 |
| D396,455 S | 7/1998 | Bier |
| 5,833,294 A | 11/1998 | Williams et al. |
| 5,839,112 A | 11/1998 | Schreitmueller et al. |
| 5,853,215 A | 12/1998 | Lowery |

(Continued)

FOREIGN PATENT DOCUMENTS

| CA | 2828017 A1 | 8/2012 |
| CN | 2154815 Y | 2/1994 |

(Continued)

OTHER PUBLICATIONS

"Oracle Depot Repair User Guide" —Retrieved from [http://docs.oracle.com/cd/E18727_01/doc.121/e13606/T231848T346845.htm#T346883] on Jun. 25, 2014.

(Continued)

*Primary Examiner* — On S Mung
(74) *Attorney, Agent, or Firm* — Banner & Witcoff, Ltd.

(57) ABSTRACT

Systems and methods provide for an automated system for analyzing damage and processing claims associated with an insured item, such as a vehicle. An enhanced claims processing server may analyze damage associated with the insured item using cameras and lasers for determining the extent and severity of the damage. To aid in this determination, the server may also interface with various internal and external databases storing reference images of undamaged items and cost estimate information for repairing previously analyzed damages of similar items. Further still, the server may generate a payment for compensating a claimant for repair of the insured item.

26 Claims, 4 Drawing Sheets

(56) References Cited

U.S. PATENT DOCUMENTS

| | | |
|---|---|---|
| 6,052,631 A | 4/2000 | Busch et al. |
| D461,822 S | 8/2002 | Okuley |
| 6,554,183 B1 | 4/2003 | Sticha et al. |
| 6,843,599 B2 | 1/2005 | Le et al. |
| 6,920,197 B2 | 7/2005 | Kang et al. |
| 7,089,592 B2 | 8/2006 | Adjaoute |
| 7,331,133 B2 | 2/2008 | Bauernfeind |
| 7,497,618 B2 | 3/2009 | Chen et al. |
| 7,602,143 B2 | 10/2009 | Capizzo |
| 7,636,676 B1 | 12/2009 | Wolery et al. |
| 7,889,931 B2 | 2/2011 | Webb et al. |
| 7,974,859 B1 | 7/2011 | Hopkins |
| 8,061,752 B2 | 11/2011 | Ohnstad et al. |
| 8,095,394 B2 | 1/2012 | Nowak et al. |
| 8,131,417 B2 | 3/2012 | Picard |
| 8,151,209 B2 | 4/2012 | Law et al. |
| 8,311,856 B1 | 11/2012 | Hanson et al. |
| 8,335,606 B2 | 12/2012 | Mian et al. |
| 8,407,139 B1 | 3/2013 | Palmer |
| 8,478,480 B2 | 7/2013 | Mian et al. |
| 8,650,068 B2 | 2/2014 | Esser et al. |
| 8,712,893 B1 | 4/2014 | Brandmaier et al. |
| 8,799,034 B1 | 8/2014 | Brandmaier et al. |
| D722,606 S | 2/2015 | Stroupe et al. |
| 8,954,226 B1 | 2/2015 | Binion et al. |
| D726,741 S | 4/2015 | Lee et al. |
| D727,928 S | 4/2015 | Allison et al. |
| 9,020,096 B2 | 4/2015 | Allman et al. |
| 9,291,544 B1 | 3/2016 | Boyer et al. |
| 9,292,544 B2 | 3/2016 | Binstock et al. |
| 9,424,606 B2 | 8/2016 | Wilson, II et al. |
| 9,684,934 B1 | 6/2017 | Wilson, II et al. |
| 9,791,590 B2 | 10/2017 | Morton |
| 2001/0041993 A1 | 11/2001 | Campbell |
| 2002/0055861 A1 | 5/2002 | King et al. |
| 2002/0072975 A1 | 6/2002 | Steele et al. |
| 2002/0120475 A1 | 8/2002 | Morimoto |
| 2002/0133721 A1 | 9/2002 | Adjaoute |
| 2002/0158968 A1 | 10/2002 | Leitgeb |
| 2002/0161533 A1 | 10/2002 | Uegaki |
| 2003/0028296 A1 | 2/2003 | Miller |
| 2003/0112263 A1 | 6/2003 | Sakai |
| 2003/0120519 A1 | 6/2003 | Candos |
| 2003/0154111 A1 | 8/2003 | Dutra et al. |
| 2003/0233261 A1 | 12/2003 | Kawahara et al. |
| 2004/0039577 A1 | 2/2004 | Roan et al. |
| 2004/0044549 A1 | 3/2004 | Loop |
| 2004/0103010 A1 | 5/2004 | Wahlbin et al. |
| 2004/0128155 A1 | 7/2004 | Vaidyanathan et al. |
| 2004/0133317 A1 | 7/2004 | Hayakawa et al. |
| 2004/0186744 A1 | 9/2004 | Lux |
| 2005/0046597 A1 | 3/2005 | Hutchison et al. |
| 2005/0083413 A1 | 4/2005 | Reed et al. |
| 2005/0108065 A1 | 5/2005 | Dorfstatter |
| 2005/0125117 A1 | 6/2005 | Breed |
| 2005/0131596 A1 | 6/2005 | Cherrington et al. |
| 2005/0146604 A1 | 7/2005 | Shinada |
| 2005/0251427 A1 | 11/2005 | Dorai et al. |
| 2006/0114531 A1* | 6/2006 | Webb ............... G01N 21/8806 359/15 |
| 2006/0132291 A1 | 6/2006 | Dourney et al. |
| 2006/0155616 A1 | 7/2006 | Moore et al. |
| 2006/0200307 A1 | 9/2006 | Riess |
| 2007/0061109 A1 | 3/2007 | Wilke et al. |
| 2007/0100669 A1* | 5/2007 | Wargin ............... G06Q 10/06 705/4 |
| 2007/0247331 A1 | 10/2007 | Angelis et al. |
| 2007/0250232 A1 | 10/2007 | Dourney et al. |
| 2008/0046261 A1 | 2/2008 | Cunningham |
| 2008/0189142 A1 | 8/2008 | Brown et al. |
| 2008/0222005 A1 | 9/2008 | Schickler |
| 2008/0267487 A1 | 10/2008 | Siri |
| 2008/0281658 A1 | 11/2008 | Siessman |
| 2009/0002364 A1 | 1/2009 | Witte, II |
| 2009/0015585 A1 | 1/2009 | Klusza |
| 2009/0018859 A1 | 1/2009 | Purifoy et al. |
| 2009/0092336 A1* | 4/2009 | Tsurumi ............... A63F 13/10 382/294 |
| 2009/0138290 A1* | 5/2009 | Holden ............... G06Q 10/087 705/4 |
| 2009/0150200 A1 | 6/2009 | Siessman |
| 2009/0265193 A1 | 10/2009 | Collins et al. |
| 2009/0290787 A1 | 11/2009 | Stevens et al. |
| 2009/0318121 A1 | 12/2009 | Marumoto |
| 2010/0057498 A1 | 3/2010 | Stephen et al. |
| 2010/0214797 A1 | 8/2010 | Wang et al. |
| 2010/0293114 A1 | 11/2010 | Khan et al. |
| 2010/0316288 A1* | 12/2010 | Ip ............... G06K 9/38 382/164 |
| 2011/0022489 A1 | 1/2011 | Hallowell et al. |
| 2011/0026673 A1 | 2/2011 | Mastronardi et al. |
| 2011/0041088 A1 | 2/2011 | Mason et al. |
| 2011/0060648 A1* | 3/2011 | Weaver ............... G06Q 30/0251 705/14.49 |
| 2011/0093159 A1 | 4/2011 | Boling et al. |
| 2011/0209074 A1 | 8/2011 | Gill et al. |
| 2011/0218825 A1* | 9/2011 | Hertenstein ............... G06Q 40/08 705/4 |
| 2011/0264582 A1 | 10/2011 | Kim et al. |
| 2011/0313936 A1 | 12/2011 | Sieger |
| 2011/0313951 A1 | 12/2011 | Cook |
| 2012/0029759 A1 | 2/2012 | Suh et al. |
| 2012/0109660 A1 | 5/2012 | Xu et al. |
| 2012/0131504 A1 | 5/2012 | Fadell et al. |
| 2012/0136802 A1 | 5/2012 | McQuade et al. |
| 2012/0245767 A1 | 9/2012 | Beggs |
| 2012/0297337 A1 | 11/2012 | St. Denis et al. |
| 2013/0080291 A1 | 3/2013 | Musuluri |
| 2013/0177134 A1 | 7/2013 | Tay |
| 2013/0317861 A1* | 11/2013 | Tofte ............... G06Q 40/08 705/4 |
| 2013/0325753 A1 | 12/2013 | Sullivan et al. |
| 2014/0074865 A1 | 3/2014 | Zobrist et al. |
| 2014/0081876 A1 | 3/2014 | Schulz |
| 2014/0082563 A1 | 3/2014 | Kim et al. |
| 2014/0085086 A1 | 3/2014 | Knapp et al. |
| 2014/0095339 A1 | 4/2014 | Cooke |
| 2014/0201022 A1 | 7/2014 | Balzer |
| 2014/0316825 A1 | 10/2014 | van Dijk et al. |
| 2015/0012169 A1 | 1/2015 | Coard |
| 2017/0147991 A1 | 5/2017 | Franke et al. |

FOREIGN PATENT DOCUMENTS

| | | |
|---|---|---|
| CN | 204506654 U | 7/2015 |
| CN | 204586638 U | 8/2015 |
| CN | 204712944 U | 10/2015 |
| DE | 4023415 A1 | 2/1991 |
| DE | 102010015566 B4 | 10/2013 |
| EP | 982673 A2 | 3/2000 |
| GB | 2468659 A | 9/2010 |
| JP | 11291846 A | 10/1999 |
| JP | 2008269087 A | 11/2008 |
| WO | 1989009386 A1 | 10/1989 |
| WO | 2006047266 A1 | 5/2006 |
| WO | 2012082700 | 6/2012 |
| WO | 2013105904 A1 | 7/2013 |

OTHER PUBLICATIONS

"SilverDAT® II"—Retrieved from [http://www.dat.de/en/offers/information-services/silverdat-ii.html] on Jun. 25, 2014.

"Estimate and manage repairs and process claims"—Retrieved from [http://www.eurotaxglass.com/products-and-services/estimate-and-manage-repairs-and-process-claims/] on Jun. 25, 2014.

*Enhanced Claims Settlement*, U.S. Appl. No. 13/458,388, filed Apr. 27, 2012.

*Streamlined Claims Processing with Non-Negotiable Payment for Repair and Repair Cost Feedback Loop*, U.S. Appl. No. 14/561,918, filed Dec. 5, 2014.

*Streamlined Claims Processing*, U.S. Appl. No. 14/465,475, filed Aug. 21, 2014.

(56) References Cited

OTHER PUBLICATIONS

*Estimating a Cost to Repair a Damaged Item without Physically Inspecting the Item*, U.S. Appl. No. 14/562,036, filed Dec. 5, 2014.
*Automatic Damage Detection and Repair Assessment*, U.S. Appl. No. 14/958,512, filed Dec. 3, 2015.
Apr. 27, 2016—U.S. Notice of Allowance—U.S. Appl. No. 13/458,388.
Puspakom Premier Services—Mobile Inspection Unit. Retrieved from [http://www.puspakom.com.my/en/inspections-a-services/range-of-services/premier-mobile-inspection.html] on Mar. 31, 2016.
Mobile Vehicle Inspection Unit for ADAC. Retrieved from [http://www.fischerpanda.de/mobile-vehicle-inspection-unit-for-adac.htm] on Mar. 31, 2016.
Jun. 13, 2016—U.S. Non-Final Office Action—U.S. Appl. No. 14/465,475.
Jun. 16, 2016—U.S. Non-Final Office Action—U.S. Appl. No. 14/562,036.
Jun. 16, 2016—U.S. Non-Final Office Action—U.S. Appl. No. 14/561,918.
Aug. 24, 2016—U.S. Non-Final Office Action—U.S. Appl. No. 14/933,228.
Internet archive waybackmachine, https://archive/org/web/ for http://www.puspakom.com.my.
Motorola MC75 | Mobile pickup and delivery software (POD) with automated fuel truck management, Vehicle Inspection Forms, Mar. 5, 2010 by Admin, 28 pages, http://www.bizspeed.com/tag/motorola-mc75/.
Nov. 10, 2016—U.S. Office Action—U.S. Appl. No. 15/271,908.
Nov. 9, 2016—U.S. Final Office Action—U.S. Appl. No. 14/562,036.
Nov. 17, 2016—U.S. Notice of Allowance—U.S. Appl. No. 14/933,228.
Dec. 5, 2016—U.S. Final Office Action—U.S. Appl. No. 14/561,918.
Feb. 22, 2017—U.S. Notice of Allowance—U.S. Appl. No. 15/271,908.
Apr. 17, 2017—U.S. Non-Final Office Action—U.S. Appl. No. 14/465,475.
Apr. 26, 2017—U.S. Non-Final Office Action—U.S. Appl. No. 14/561,918.
May 24, 2017—U.S. Non-Final Office Action—U.S. Appl. No. 14/562,036.
Jul. 6, 2017—U.S. Non-Final Office Action—U.S. Appl. No. 15/598,549.
Aug. 24, 2017—U.S. Notice of Allowance—U.S. Appl. No. 15/598,549.
Sep. 21, 2017—U.S. Final Office Action—U.S. Appl. No. 14/465,475.
Oct. 13, 2017—U.S. Office Action—U.S. Appl. No. 14/561,918.
Oct. 24, 2017—U.S. Final Office Action—U.S. Appl. No. 14/562,036.
Oct. 25, 2017—U.S. Non-Final Office Action—U.S. Appl. No. 15/623,660.
Oct. 27, 2017—U.S. Non-Final Office Action—U.S. Appl. No. 15/705,407.
Nov. 8, 2017—International Search Report and Written Opinion Appn PCT/US17/48618.
Jan. 9, 2018—U.S. Non-Final Office Action—U.S. Appl. No. 14/465,475.
Mar. 14, 2018—U.S. Non-Final Office Action—U.S. Appl. No. 14/561,918.
Mar. 21, 2018—U.S. Non-Final Office Action—U.S. Appl. No. 14/562,036.
Apr. 6, 2016—U.S. Final Office Action—U.S. Appl. No. 15/705,407.
Jul. 10, 2018—U.S. Final Office Action—U.S. Appl. No. 14/465,475.
Aug. 6, 2018—U.S. Non-Final Office Action—U.S. Appl. No. 14/958,512.
Apr. 3, 2018—U.S. Non-Final Office Action—U.S. Appl. No. 15/701,866.
English Abstract and English Machine Translation of Description and Claims of CN204586638U.
English Abstract and English Machine Translation of Description and Claims of CN204712944U.
English Abstract and English Machine Translation of Description and Claims of CN204506654U.
May 3, 2018—Final Office Action—U.S. Appl. No. 15/623,660.
Automatic surface inspection of vehicles. Franke, R., Schulte, M., Bothe, T. et al. ATZ Prod Worldw (2010) 3: 12. <https://doi.org/10.1007/BF03224230>.
Innovation in Optical Measuring Technology. p. 6. tech transfer—Gateway2Innovation. Apr. 2010.
"Fender Bender—Nationwide Introduces Automated Mobile Hail Estimating," retrieved from www.fenderbender.com/articles/4847-nationwide-introduces-automated-mobile-hail-estimating on Apr. 29, 2015.
Aug. 31, 2018—U.S. Final Office Action—U.S. Appl. No. 14/562,036.
Sep. 7, 2018—U.S. Final Office Action—U.S. Appl. No. 14/561,918.
Sep. 5, 2018—U.S. Non-Final Office Action—U.S. Appl. No. 15/705,407.
Oct. 17, 2018—U.S. Non-Final Office Action—U.S. Appl. No. 15/623,660.
Nov. 8, 2018—U.S. Non-Final Office Action—U.S. Appl. No. 14/465,475.

\* cited by examiner

AUTOMATED DAMAGE ASSESSMENT AND CLAIMS PROCESSING

CROSS REFERENCE TO RELATED APPLICATIONS

This application is related to U.S. application Ser. No. 13/728,663, which is being filed concurrently with this application and which is herein incorporated by reference in its entirety.

TECHNICAL FIELD

The present invention relates to systems and methods for analyzing damage to an insured item such as a vehicle and processing an insurance claim related to the analyzed damage.

BACKGROUND

Conventional insurance claims processing is a complex process that starts with a first notification of loss related to an insured item. Upon notification of loss, the claim may be routed to multiple claims adjusters that analyze different aspects of the damage associated with the insured item in order to determine whether compensation for the loss is appropriate.

In general, conventional claims adjustment can involve paperwork processing, telephone calls, and potentially face-to-face meetings between claimant and adjuster. In addition, a significant amount of time can elapse between a first notice of loss from the claimant and the final settlement of the claim.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure involve a streamlined and efficient process for claims management and disclose methods, computer-readable media, and apparatuses for automating the processing and settling of claims related to an insured item. An enhanced claims processing server may manage the analysis of damage associated with an insured item and the settlement of a claim related to the damage.

In another aspect of the disclosure, an enhanced claims processing server may interface with a variety of sensors for assessing damage to insured items.

Further aspects of the disclosure may be provided in a computer-readable medium having computer-executable instructions that, when executed, cause a computer, user terminal, or other apparatus to at least perform one or more of the processes described herein.

BRIEF DESCRIPTION OF THE DRAWINGS

All descriptions are exemplary and explanatory only and are not intended to restrict the invention, as claimed. The accompanying drawings, which are incorporated in and constitute a part of this specification, illustrate embodiments of the invention and, together with the description, serve to explain the principles of the invention. In the drawings:

DETAILED DESCRIPTION

In accordance with various aspects of the disclosure, methods, computer-readable media, and apparatuses are disclosed in which insurance claims may be settled through an enhanced automated process. In certain aspects, an enhanced claims processing server manages the assessment of damage and the settlement of a claim associated with an insured item such as a vehicle.

The automated process may utilize various hardware components (e.g., processors, communication servers, memory devices, sensors, etc.) and related computer algorithms to examine the loss associated with an insured item after a claim has been filed and to determine if a payment is appropriate to the claimant as compensation for the assessed loss.

Figure 1:
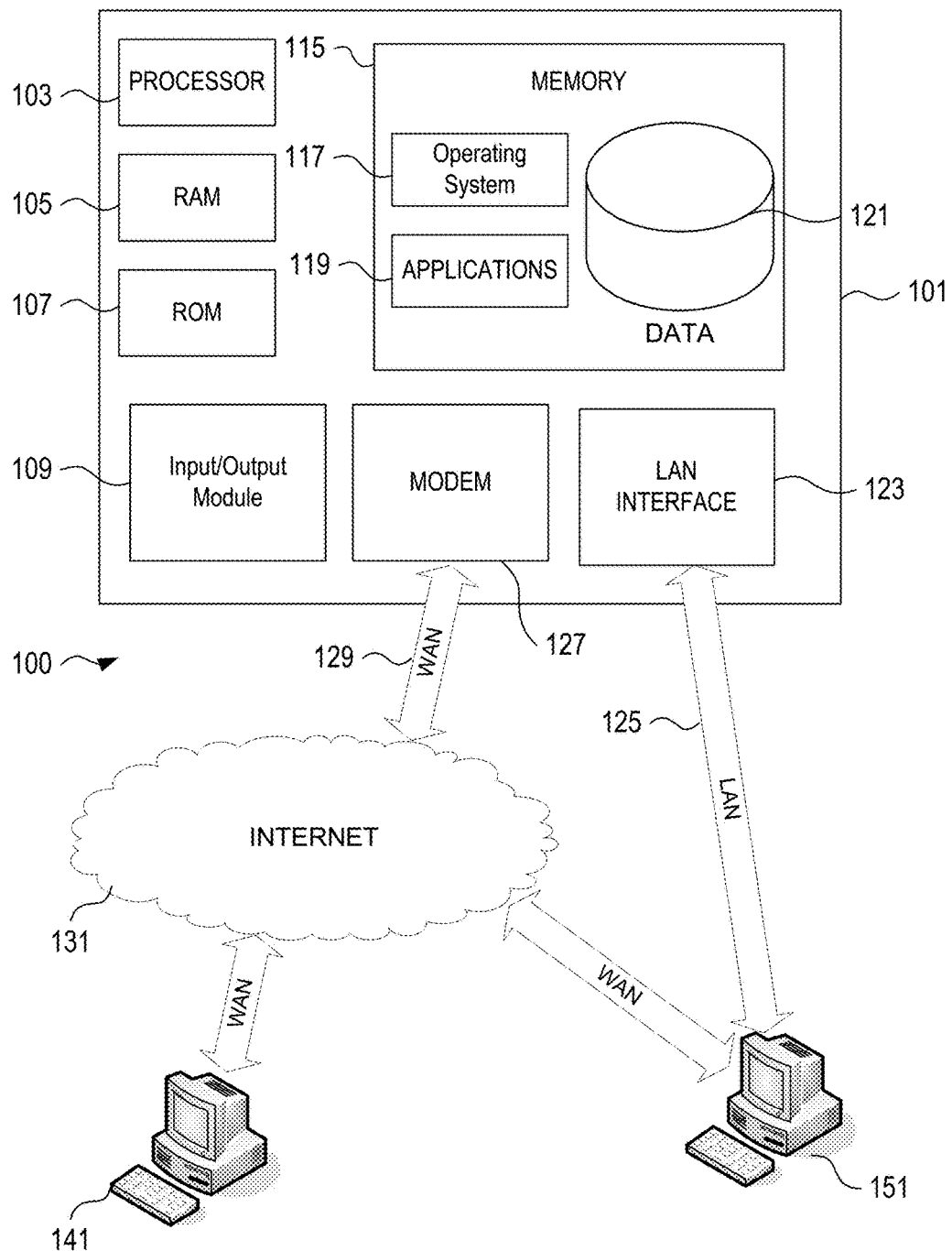
FIG. 1 shows an illustrative operating environment in which various aspects of the disclosure may be implemented.

FIG. 1 illustrates a block diagram of an enhanced claims processing server 101 (e.g., a computer server) in communication system 100 that may be used according to an illustrative embodiment of the disclosure. The server 101 may have a processor 103 for controlling overall operation of the enhanced claims processing server 101 and its associated components, including RAM 105, ROM 107, input/output module 109, and memory 115.

I/O 109 may include a microphone, keypad, mouse, touch screen, and/or stylus through which a user of enhanced claims processing server 101 may provide input, and may also include one or more of a speaker for providing audio output and a video display device for providing textual, audiovisual, and/or graphical output. Software may be stored within memory 115 to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to analyze the depth of damage associated with the body of a vehicle by interfacing with lasers. In addition, processor 103 may determine the general location of damage associated with the vehicle by analyzing images of the vehicle and comparing these images with reference images of a similar vehicle with no damage.

The server 101 may operate in a networked environment supporting connections to one or more remote computers, such as terminals 141 and 151. The terminals 141 and 151 may be personal computers or servers that include many or all of the elements described above relative to the server 101. Also, terminal 141 and/or 151 may be data stores for storing image data of insured items that have been analyzed by the enhanced claims processing server 101 in the past. In yet other embodiments, terminals 141 and 151 may represent devices such as cameras and/or lasers for analyzing damage associated with an insured item.

The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced claims processing server 101 according to an illustrative embodiment of the disclosure may include computer executable instructions for invoking functionality related to calculating an appropriate payment for assessed damage associated with an insured item.

Enhanced claims processing server 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Figure 2:
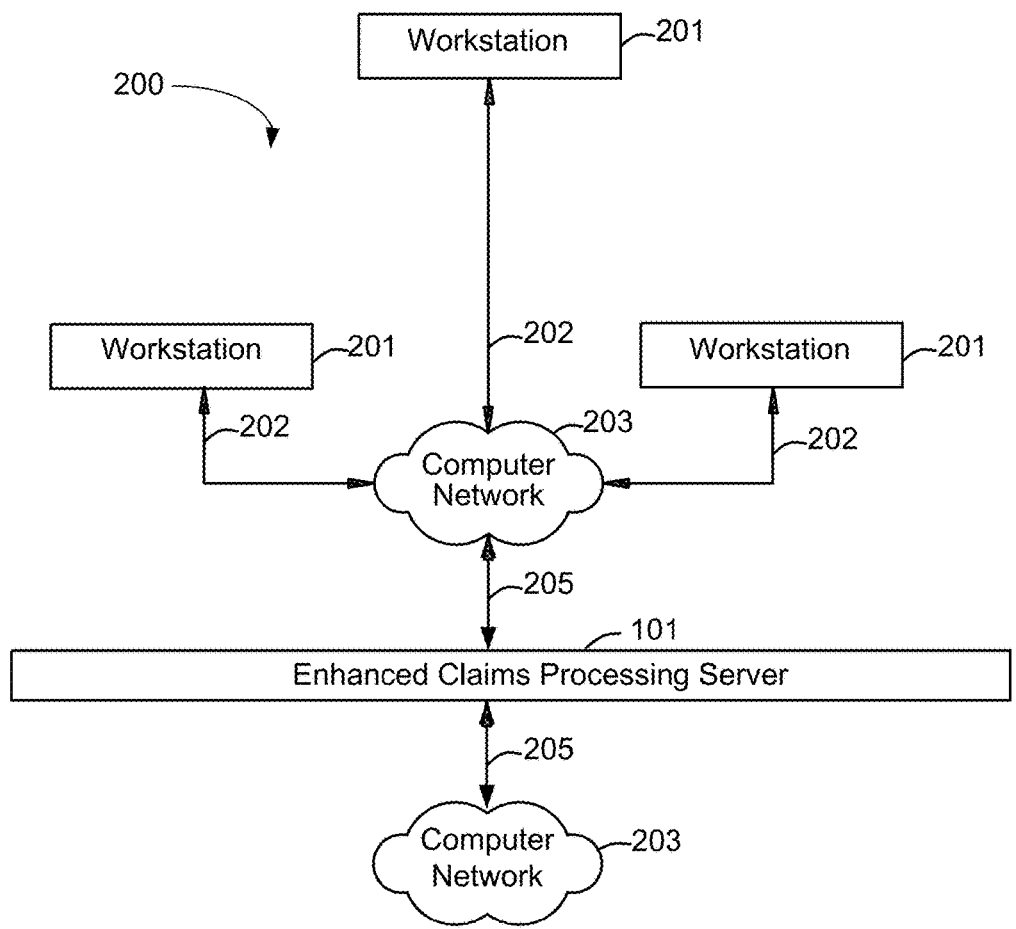
FIG. 2 shows a first block diagram of workstations and servers that may be used to implement the processes and functions of certain aspects of the present disclosure.

Referring to FIG. 2, a first system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to enhanced claims processing server 101. In certain embodiments, workstations 201 may run different algorithms used by server 101 for analyzing image data of damage associated with an insured item, or, in other embodiments, workstations 201 may be data stores for storing reference image data of insured items. In yet other embodiments, workstations 201 may represent various devices (e.g., cameras, lasers, etc.) for analyzing the damage associated with an insured item. In system 200, enhanced claims processing server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 101, such as network links, dial-up links, wireless links, hard-wired links, etc.

The steps that follow in the Figures may be implemented by one or more of the components in FIGS. 1 and 2 and/or other components, including other computing devices.

In accordance with aspects of the disclosure, an enhanced claims processing server 101 may receive information about damage associated with an insured item (e.g., a vehicle). Server 101 may then process this information to generate output, including a cost estimate to repair the damage associated with the insured item and/or to replace a damaged part of the insured item. In some aspects, server 101 may determine the location of damage (e.g., exterior parts, etc.), extent of damage, and the cost of parts/labor to fix the damage.

In some instances, depending on the amount of damage to the insured item, the cost estimate may represent the cost of replacing the insured item itself. Along with the cost estimate for repair/replacement of the insured item, server 101 may also output various claims documents, including disclosures, brochures, guarantees, etc. If appropriate, server 101 may transmit a payment to the claimant, for the cost of repairing the damage or replacing a part. In addition, server 101 may inform the claimant approximately how long it will take to repair/replace the insured item.

In some aspects, damage inspection and appraisal in the automated claims processing scheme discussed herein may be completed in thirty minutes or less.

Although embodiments of the disclosure discussed herein relate to an insured vehicle analyzed by enhanced claims processing server 101, one of ordinary skill in the art would recognize that other types of insured items, including homes, may be employed with a similar scheme.

In certain aspects, a claimant driving a damaged vehicle (e.g., car, boat, truck, etc.) may drive to a location that analyzes the damage associated with the vehicle. Initially, the claimant may key in critical car information (e.g., vehicle identification number (VIN), make, model, year of manufacture, etc.) that is received by the enhanced claims processing server 101 and wait in an attached waiting lounge while the vehicle is analyzed by various sensors associated with the enhanced claims processing server 101. Once the damage analysis and assessment is complete, the claimant may drive away from the damage analysis center with claims documents, a repair/replacement cost estimate, a payment for assessed loss, and estimates for the time to repair/replace the vehicle.

In certain aspects, the process discussed herein may allow for more flexibility and availability in appointment times associated with inspection and assessment of damage of insured items. In particular, the use of server 101 may aid in cutting down time between a first notice of loss and settlement of the claim associated with the loss (e.g., via a payment and/or information regarding repair/replacement of an insured item). In addition, because the methods discussed herein are automated and involve minimal and/or no involvement from claims adjusters, less time and money may be spent to transport these adjusters to inspection locations. The automated nature of this process may also create the opportunity for remote human inspections of damage associated with insured items.

Also, the technologies used in the claims adjustment processes implemented by server 101 may aid in attracting technology savvy consumers to an entity (e.g., an insurance company) managing server 101.

Figure 3:
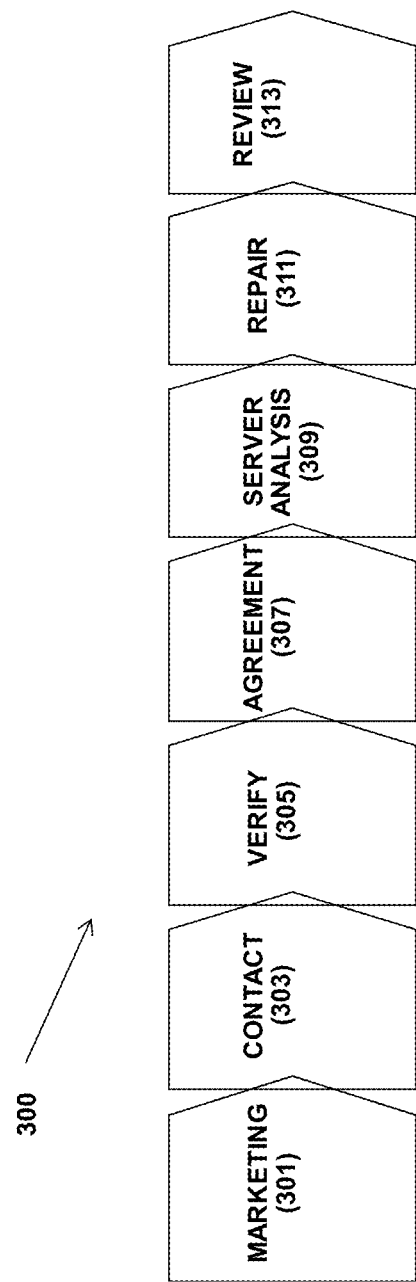
FIG. 3 shows a flow chart for an automated process in accordance with certain aspects of the present disclosure.

FIG. 3 shows a flow chart for an automated process 300 in accordance with at least one aspect of the present disclosure. Although process 300 assumes that the insured item is a vehicle that has been damaged, one of ordinary skill in the art would recognize that the process may easily apply to other types of insured items (e.g., a home). The process 300 may start out at step 301 where an enhanced claims processing server 101 may market the automated damage assessment and claims processing scheme discussed herein to engage potential consumers so that they are aware of the capabilities. Marketing step 301 may be accomplished in a variety of ways, including through traditional advertising, via email, as literature included in bill inserts, etc.

Once the capabilities of enhanced claims processing server 101 are properly marketed, the process may move to step 303 where a claimant (e.g., owner/operator of the vehicle, etc.) may contact an entity managing enhanced claims processing server 101 (e.g., an insurance company, etc.) with a first notice of loss (FNOL). The claimant may contact the insurance company in any number of ways, including via phone, by email, via a company website, etc. As part of the FNOL, the claimant may provide basic identifying and/or validating information (e.g., name, age, claim number, etc.) and vehicle information, including the make, model, and year of manufacture. The claimant may also provide the general areas of damage to the vehicle and any other relevant details (e.g., condition of glass, under carriage, engine, wheels, airbags, etc. associated with the vehicle). In one embodiment, this information may be provided through a kiosk located at a vehicle damage analysis and claims processing facility managed by server 101. In other embodiments, this information may be provided from a remote location (e.g., location of an accident, claimant's home, etc.)

The process may then move to step 305 where enhanced claims processing server 101 may determine if the damaged vehicle can be properly accessed. For instance, server 101 may determine whether or not the damaged vehicle can be driven to an automated damage analysis and/or claims processing facility or whether or not server 101 is equipped to analyze/assess the size and/or shape of the vehicle in question. However, in general, server 101 may be equipped to analyze/assess more than one type (e.g., size, shape, etc.) of insured item. The server 101 may also determine whether or not it is available to analyze, assess, and process damage associated with the vehicle in question.

If server 101 determines that the vehicle may be processed, the process may move to step 307 where the claimant and the entity managing server 101 may enter into an agreement that details the terms under which server 101 may analyze, assess, and process the damage related to the vehicle. For instance, the agreement may specify that server 101 may only provide a cost estimate for the assessed damage to the vehicle. In other embodiments, the agreement may specify that server 101 may also transmit a payment (e.g., check, cash, etc.) for the assessed damage to the claimant.

The process may then move to step 309 where server 101 may assess the extent of damage associated with the vehicle. The assessment may occur through the use of a variety of sensors and devices, including cameras, lasers, lights, etc. For instance, server 101 may direct cameras to take pictures of damaged areas associated with the vehicle. Server 101 may also use a controlled lighting environment for easier processing of images. Each camera may be remotely controlled by server 101 and each image may be transferred to a data storage (e.g., workstations 201, etc.) once acquired. In some embodiments, the cameras may take pictures of parts of the entire vehicle. Then server 101 may stitch the images together to reproduce an image of the entire vehicle and to obtain better resolution of the vehicle. In one embodiment, the vehicle may be divided into three portions and images from the three portions may be stitched together (e.g., via image processing software, etc.) to reproduce an image of the complete vehicle. Also, the cameras and the vehicle may be stationary or moving while the images are being taken.

Once damage to the vehicle has been localized via the image data, lasers (e.g., range finders, time-of-flight measurement lasers, etc.) may also be directed by servo and stepper motors to the damaged region and used to detect and classify the depth of the damage. For instance, if the vehicle has been dented in a particular location, a laser may be directed to the dented area and the interference of the laser with the dented surface may be used to map the depth of the dent and identify the type/classification of the dent (e.g., wrinkled or ridged, turbulent or multi-ridged, smooth-dish, scratches, etc.). In additional aspects, the time that an electromagnetic wave emitted from the laser takes to be reflected from the surface of the damaged area and transmitted to a predetermined sensor may be determined and used to map the depth of the dent and identify the type/classification of the dent. To direct the laser to the damaged area, server 101 may overlay a first grid on an image of the damaged area and a second grid on a corresponding reference image that depicts the same area undamaged. By comparing the grid numbers on the image of the damaged area and the reference, the laser may be moved precisely to the damaged area. Moreover, for obtaining the depth of damage, the damaged area may be scanned by the lasers more than once and measurements from each scan may be averaged to obtain a more accurate depth reading. Server 101 may recognize that a smooth dent, for example, has a gradual increase in depth and that wrinkled and turbulent dents do not exhibit this characteristic; in other examples, a small variation in depth within the damaged area may be recognized as a scratch. In yet other examples, a gradual change inwards may be recognized as a smooth dish dent whereas a gradual change outwards accompanied by the presence of nearby bent character lines (e.g., edges, etc.) may be recognized as a "pooched" or bubbled out dent. In other aspects, a tear may be identified by a significant, sudden increase in the depth of damage. The severity of a dent may further be classified by the area impacted by the damage. In one embodiment, during the analysis of dents, server 101 may determine the deepest point in the dent and move radially outwards. One of ordinary skill in the art would recognize that server 101 may implement numerous other classifications to identify the type of damage associated with the vehicle. For instance, server 101 may count the number of ridges in the dent and further classify the dent based on this number. In addition, server 101 may determine the severity of the dent (e.g., turbulent dents may be rated as most severe whereas smooth dents may be rated as less severe).

In addition to imaging of the vehicle using cameras and lasers, server 101 may detect fluid leaks from the vehicle and use this information to determine which interior parts in the vehicle may be damaged.

During the imaging of the vehicle, the claimant may wait in a waiting area associated with the damage analysis and claims processing facility (e.g., a facility that includes cameras, lasers, processors, etc.) managed by server 101. During the wait, server 101 may alert the claimant at relevant points during the analysis process. For instance, server 101 may alert the claimant when server 101 has identified specific damage associated with the vehicle. The identified damage may be displayed to the claimant on a display screen associated with server 101. Server 101 may also query the claimant as to the accuracy of the identified damage. Server 101 may then receive a response from the claimant regarding the accuracy of the identified damage.

In certain aspects, server 101 may also query the claimant with regards to the type of third party service provider (e.g., repair shop, etc.) they would prefer after damage analysis and claims processing is complete.

In other aspects, exterior damage associated with the vehicle may be used to predict (e.g., via predictive modeling using the database of past assessed exterior/interior damage for other similar cases, etc.) the likelihood of interior (e.g., mechanical, cabin, etc.) damage to the vehicle and/or potential difficulties in repairing the vehicle.

Once the vehicle has been imaged with cameras and lasers, server 101 may include computer-executable instructions to recognize the extent of damage to various parts of the vehicle (e.g., chassis, etc.), including various types of dents and edge damage, and to identify various parts of the vehicle.

In some aspects, the detection of damage to the vehicle may be based on object recognition algorithms that compare images (e.g., comparing x, y, and z coordinates of each point on the images) of the vehicle in question to reference images of similar vehicles (e.g., same model, make, year of manufacture, etc.) with no damage. More specifically, server 101 may access a database of images storing the reference images of vehicles of various models and makes. By using object recognition/edge detection algorithms (e.g., involving blur filters, gray-scaling, custom algorithms, etc.), server 101 may determine where damage is located as well as the potential size/area of the damage. As mentioned above, lasers may be used to confirm the size of the damage. Server 101 may also access internal/external databases storing images, damage depth map information (e.g., from previously assessed laser scans, etc.), and/or processed claims reports from damaged vehicles that the server 101 has assessed previously. In particular, server 101 may access images/depth map information from previously assessed damaged vehicles for use as a guidepost in assessing the damage of a new vehicle. If no reference information (e.g., data, images) exists, axis symmetry information may also be used to identify possible irregularities and/or damage.

In some aspects, the algorithm employed by server 101 may use a comparison of an image of a damaged vehicle with an image of an undamaged version of the same vehicle to "subtract out" and isolate the damaged area of a vehicle. If an exact replica of an undamaged vehicle corresponding to a damaged vehicle under study is not available for this comparison, server 101 may further use various additional image processing algorithms, including blurring filters, etc. to detect a damaged portion of a vehicle.

In additional aspects, server 101 may grayscale all image data to make processing faster. Further, edge filters may be applied to both the image of a damaged vehicle and its corresponding reference image so that the edges of a damaged area may be "subtracted out" and identified in the image of the damaged vehicle. Once the damaged area has been identified in the image data, server 101 may further process the damaged area to sharpen the area, to make the edges more prominent, and to fill any missing links found in the edges. Afterwards, server 101 may color, texture, and/or otherwise "fill in" the damaged area surrounded by the edges and extract the damaged area from the surrounding image. Once the damaged area has been isolated, server 101 may calculate the precise area of the damage.

Similarly, server 101 may coordinate various lasers to determine the depth of a damaged area. Server 101 may analyze raw depth data obtained from the lasers to further investigate points of interest (e.g., a point that has a much larger depth than surrounding points, etc.). Using this analysis, the damaged area may be further characterized (e.g., a dented area may be detected and if, for example, the general slope of the dent is high, the dent may be characterized as deep and rounded whereas if the slope is low, the dent may be characterized as shallow.)

In addition, if the server 101 retrieves image data or claims reports associated with a similar or the same previously analyzed vehicle that has similar or the same types of damage (e.g., as a result of a similar accident to a similar vehicle or part, etc.) as a vehicle currently being analyzed, server 101 may use a damage analysis or cost estimate of identifying/repairing the damage or replacing a damaged part of the previously analyzed vehicle to generate a damage analysis/cost estimate for the currently analyzed vehicle. In other words, server 101 may perform one or more database queries to match characteristics of the current analysis with previous analyses. For instance, the queries may seek to match the size, depth, and location of a dent on a current vehicle with a similar dent on a vehicle with a similar chassis configuration, make, model, and year of manufacture. For instance, consider a case where the vehicle in question is a new model that has not been analyzed before by server 101. In this scenario, server 101 may attempt to match the vehicle currently being analyzed with its closest match, which in this case may be a similar model from the previous year with the same chassis configuration (e.g., a twin chassis configuration).

In matching a vehicle currently being analyzed with one that has been previously analyzed, server 101 may assign a confidence factor to the match. Server 101 may assign the highest confidence factor (e.g., a confidence factor of 100%) to a comparison between the exact same types of vehicles (e.g., cars of the same make, model, year of manufacture, etc.) having the exact same type of damage (e.g., a predetermined type of dent, etc.). For instance, a comparison between vehicles with two completely different types of damage would have a confidence factor of 0%. As the similarities between the currently analyzed vehicle and previously analyzed vehicles are reduced, server 101 may assign a lower confidence factor to the comparison. For instance, output drawn from comparisons between vehicles of the same make and model but with different years of manufacture may be associated with a slightly lower confidence factor than 100%. In some aspects, confidence factors may decrease further when vehicles of different models and years of manufacture (e.g., vehicles with different chassis configurations, trim line configurations, etc.) but the same make are compared. In one embodiment, server 101 may assign a threshold confidence factor (e.g., 70%, etc.) below which output generated by a comparison performed by server 101 may not be considered reliable. If the confidence factor associated with a comparison between two vehicles falls below this threshold and there is no reliable comparison within the database, server 101 may then use physical details of the damage (e.g., size, location, area, etc.) to provide output such as a cost estimate for damage repair/replacement and/or the amount of time required for repair/replacement.

Server 101 may also use stored data to determine appropriate vendors for repairing/replacing the vehicle and the amount of time for repair/replacement. The wait time for repair/replacement may depend on various factors, including the size (e.g., area, depth, etc.), classification (e.g., turbulent dent, etc.), and location of the damage.

In addition, server 101 may determine if parts nearby to damaged parts may also need to be blended into the damaged area. In other words, if a part of the vehicle needs to be refinished (e.g., repainted) either because it is being replaced or repaired, parts within a predetermined distance of the repaired/replaced part may need to be blended (e.g., color-matched) to the repaired/replaced part.

In some aspects, server 101 may acquire the knowledge of all previous claims processed by server 101, as well as the knowledge of human adjusters, to accurately process future claims. In this way, server 101 may use machine learning to evolve its cost and/or repair estimation procedure based on past experience.

To estimate the cost and repair/replacement time associated with the damage to the vehicle and to determine whether to recommend that the vehicle be replaced or repaired, server 101 may also consider the extent/severity of the damage (area, depth, location, classification, etc.). For instance, damage to a character line (e.g., edge of a door associated with the vehicle) would be more difficult (e.g., more expensive and/or more time-consuming, etc.) to repair than damage to a more central location on the vehicle. Server 101 may also consider the actual cash value and the salvage value of the vehicle and any relevant local, state, and national laws in this analysis. In some aspects, server 101 may generate a rough cost estimate of repairing the damage just based on the extent of the damage; then server 101 may refine this estimate by analyzing previous cost estimates provided by server 101 and/or actual repair data received from third party service providers (e.g., repair shops, etc.) that have repaired similar vehicles with similar damage. In additional aspects, server 101 may generate a basic cost estimate by taking into account factors such as the number of hours predicted for the repair, the labor rate, and the current market conditions. In this aspect, server 101 may compare this basic cost estimate with the cost of merely replacing the vehicle (e.g., a total loss) or the damaged part within the vehicle and based on the comparison, server 101 may recommend the cheaper option. These estimates may also be transmitted to existing platforms (e.g., Audatex®, Mitchell®, etc.) for comparison purposes.

If the analyzed damage to the vehicle is different from the damage indicated by the claimant during the FNOL, server 101 may query the claimant as to the discrepancy. For instance, if the claimant initially provided information relating to damage on the left side of the vehicle but server 101 discovers that the primary damage occurred on the right side, server 101 may question the claimant as to when the damage occurred (e.g., was the damage due to a previous incident or preexisting condition?, is the claimant being truthful?, etc.). Server 101 may also ask the claimant to sign a statement as to the truth of the information provided. The claimant may have the option of answering the questions as they come up or the questions may be queued until the server 101 has finished processing the image/laser analysis of the vehicle. If discrepancies between the claimant's answers and the analyzed damage to the vehicle continue to exist, server 101 may request the involvement of a human claims adjuster.

The design of the analysis and processing facility managed by server 101 may facilitate the size and shape of the insured item being analyzed. For instance, with a vehicle, the analysis facility may be shaped like a cube or a box into which the vehicle may drive. In some aspects, sensors within the cube or box may indicate when the vehicle is in the correct position for analysis and processing. In some embodiments, the analysis facility may be mobile/portable such that the facility may be transported to the damaged vehicle. For instance, the analysis facility may be configured as a container that attaches to the motorized portion of a truck so that when the facility reaches the damaged vehicle, the vehicle may quickly enter the container for analysis. In this aspect, the facility may also serve to tow vehicles that are not drivable due to their level of damage (e.g., for catastrophic damage, etc.). In addition, the analysis facility may have additional cameras and/or network communications capabilities to allow a remotely-located adjuster to evaluate the performance of server 101.

In some aspects, the damage analysis and claims processing facility managed by server 101 may be attached to an existing facility managed by the entity (e.g., an insurance company, etc.) overseeing server 101. In one example, this facility may serve as a completely autonomous resource; in other examples, this facility may serve as a permanent facility monitored by claims adjusters to assist with processing claims and damage analysis when the number of consumers needing services exceeds a predetermined threshold.

In additional aspects, the damage analysis and claims processing facility managed by server 101 may be attached to other venues, including third party service providers (e.g., vehicle repair shops, other insurance agencies, etc.). In this aspect, the damage analysis and claims processing facility managed by server 101 may also serve as a semi-permanent, stand-alone facility that replaces and/or augments the capabilities of claims adjusters who rotate between multiple locations.

After server 101 analyzes and assesses the damage to the vehicle, the process shown in FIG. 3 may move to step 311 where the vehicle may be repaired/replaced at a third party service provider. Finally, the process may move to step 313 where a consumer may provide feedback designed to evaluate his/her experience through process 300. This feedback may be used to improve the process 300 for future consumers and may involve the use of surveys, questionnaires, email, etc.

Figure 4:
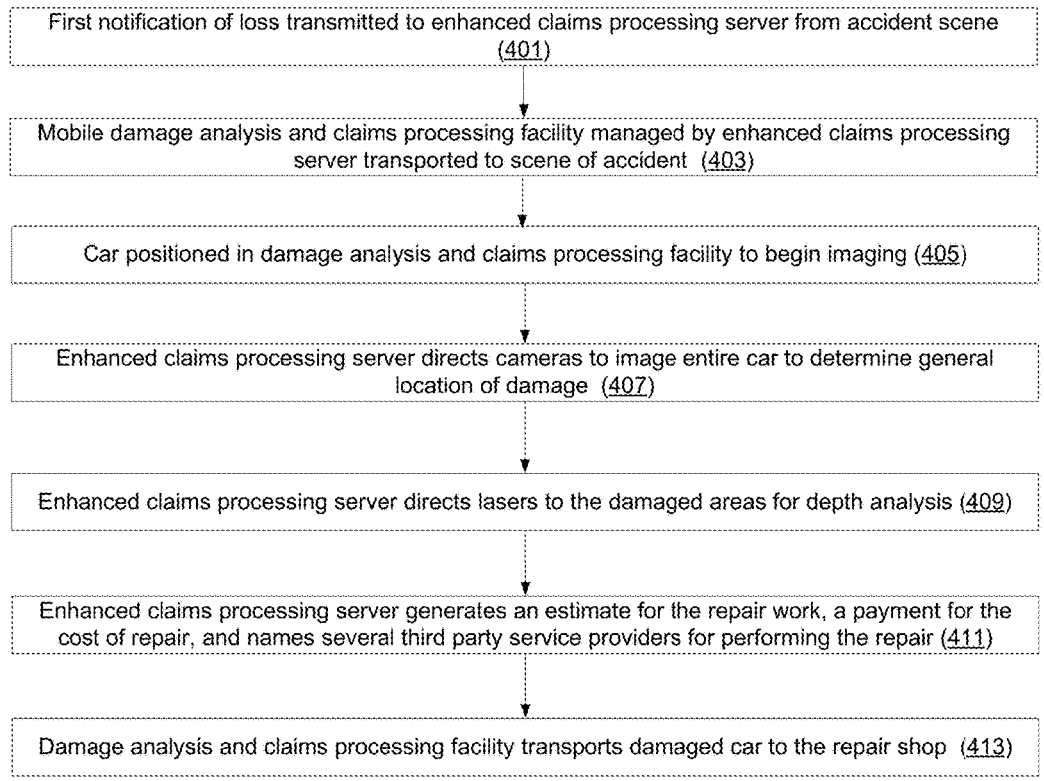
FIG. 4 shows a flow chart of an example using an enhanced claims processing server, in accordance with certain aspects of the present disclosure.

FIG. 4 shows a flow chart of an example using an enhanced claims processing server, in accordance with at least one aspect of the present disclosure. The example in FIG. 4 assumes that a car has been damaged in an accident to the point where it can no longer be driven. The process in FIG. 4 may start out at step 401 where a first notification of loss may be transmitted to the enhanced claims processing server 101 from the scene of the accident. Assume that the driver (and in this case the owner) of the damaged car sends a text message with information about his location, details about the accident, and the claim number to server 101.

Once the FNOL information reaches server 101, a mobile damage analysis and claims processing facility managed by server 101 may be transported to the scene of the accident in step 403. The car may then be positioned in the facility to begin analysis of the damage in step 405. In this case, the car is loaded into the back of a truck housing the analysis and processing devices necessary for determining the nature of the damage to the car.

The process may then move to step 407 where the server 101 may direct cameras to image the entire car. From these images, the general location of visible damage to the car may be determined. Assume that in this case, the car's front bumper and hood have been dented at several locations and that no other damage exists. In this scenario, the process may then move to step 409 where lasers may be directed to the dented regions to determine the depth of the dents.

Once the morphology of the damage has been determined, server 101 may determine an approximate cost of repair, may generate a payment for the cost of repair, and may output the names and addresses of several repair shops that can handle the repair work in step 411. In this case, server 101 may also make an appointment with one of the repair shops. Then, in step 413, the mobile damage analysis and claims processing facility may then transport the car to the repair shop so that the owner may obtain a repaired car quickly.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A method comprising:
receiving, from a device chosen from at least one of a first display and a keypad associated with an enhanced claims processing server, loss information associated with an insurance claim of an insured item;
directing, at a claims processor associated with the enhanced claims processing server, a plurality of cameras to capture images of the insured item;
determining, at the claims processor, at least one damaged area of the insured item by applying an edge filter to the captured images of the insured item and a reference image of another item of a same type as the insured item and subtracting image data of the insured item from the reference image of the other item of the same type as the insured item to isolate an image portion containing only damage to the insured item;
further processing the image portion containing only the damage to the insured item to fill any missing links in edges of the at least one damaged area;
based on the determination, directing, at the claims processor, a plurality of lasers to capture additional data of the at least one damaged area, the additional data including raw depth data, the directing the plurality of lasers further including:
identifying a location of the at least one damaged area by:
overlaying a first grid on at least one captured image of the insured item and a second grid on the reference image; and
comparing grid numbers of the at least one damaged area on the first grid to the second grid; and
directing the plurality of lasers to capture the additional data of the at least one damaged area based on the compared grid numbers;
mapping, based on the additional data captured from the plurality of lasers and the further processed image portion, a depth of damage to the at least one damaged area and identifying, based on the mapping, a type of damage to the at least one damaged area; and
outputting, through a communication module associated with the enhanced claims processing server, damage information to an insurance consumer associated with the insured item, the damage information including the depth of damage and type of damage.

2. The method of claim 1, wherein the loss information includes a name, address, and age of the insurance consumer and a description of damage associated with the insured item.

3. The method of claim 1, further comprising: using the claims processor, entering into an agreement with the insurance consumer as to terms under which the enhanced claims processing server analyzes and processes the insurance claim.

4. The method of claim 1, wherein the plurality of lasers communicate with a laser processor to perform further imaging of the at least one damaged area.

5. The method of claim 1, wherein the plurality of cameras use a controlled lighting environment for easier imaging.

6. The method of claim 1, further comprising: storing a plurality of images generated from the imaging in a data store associated with the enhanced claims processing server.

7. The method of claim 1, wherein the at least one damaged area includes a plurality of dents.

8. The method of claim 7, wherein each of the plurality of dents belongs to a type chosen from a group consisting of: smooth dish, wrinkled, and turbulent.

9. The method of claim 1, further comprising: using the claims processor, directing a fluids processor associated with a fluid sensing device to detect a type of fluid leaking from the insured item to determine which interior parts in the insured item are damaged.

10. The method of claim 1, further comprising: using the claims processor, directing positioning of the insured item.

11. The method of claim 1, wherein the plurality of cameras communicate with a camera processor to perform imaging of the insured item.

12. The method of claim 1, wherein the outputting includes displaying the damage information on a second display associated with the enhanced claims processing server.

13. A claims processing system comprising:
an input module configured to receive loss information related to an insured item;
a claims processor configured to direct a camera processor associated with a plurality of cameras to image the insured item, to generate a reproduced image of the insured item via stitching together first images generated by the plurality of cameras, and to determine at least one damaged area of the insured item based on the reproduced image, the claims processor further configured to direct a laser processor associated with a plurality of lasers to capture additional data to evaluate the at least one damaged area, the additional data including raw depth data, the laser processor configured to:
identify a location of the at least one damaged area by:
overlaying a first grid on at least one captured image of the insured item and a second grid on a reference image; and
comparing grid numbers of the at least one damaged area on the first grid to the second grid; and
directing the plurality of lasers to capture the additional data of the at least one damaged area based on the compared grid numbers;
the plurality of cameras configured to communicate with the camera processor to generate the first images of the insured item; and
the plurality of lasers configured to communicate with the laser processor to map a depth of damage to the at least one damaged area and, based on the mapping, identify a type of damage to the at least one damaged area.

14. The claims processing system of claim 13, wherein the claims processor is further configured to query an insurance consumer, through a display device associated with the claims processor, about accuracy of the loss information.

15. The claims processing system of claim 13, wherein the claims processor is further configured to access, through an output module associated with the claims processing system, a database of reference images that depict undamaged items similar to the insured item.

16. The claims processing system of claim 15, wherein the claims processor is further configured to compare the reference images to the first images to determine a severity of the at least one damaged area.

17. The claims processing system of claim 16, wherein the comparing involves using blur filters and gray-scaling.

18. The claims processing system of claim 16, wherein the claims processor is further configured to assign a confidence factor to the comparison based on how similar the reference images in the database are to the first images.

19. The claims processing system of claim 13, wherein the claims processor is further configured to access a database storing cost estimate information for repairing other items similar to the insured item and with damage similar to the at least one damaged area to determine a new cost estimate for repairing the insured item.

20. The claims processing system of claim 13, wherein the claims processor is further configured to direct an analysis facility to a location of the insured item.

21. An apparatus comprising:
a processor; and
a memory storing computer-readable instructions that, when executed by the processor, cause the apparatus at least to:
direct a plurality of cameras to generate a plurality of first images of an insured vehicle;
access a first database storing a plurality of reference images depicting undamaged vehicles similar to the insured vehicle;
compare the plurality of first images to the plurality of reference images to determine at least one damaged area on the insured vehicle;
based on the determination, direct at least one laser to the at least one damaged area to capture additional data of the at least one damaged area to evaluate the at least one damaged area, the additional data including raw depth data, directing the at least one laser including:
identifying a location of the at least one damaged area by:
overlaying a first grid on at least one captured image of the insured vehicle and a second grid on a reference image; and
comparing grid numbers of the at least one damaged area on the first grid to the second grid; and
directing the at least one laser to capture the additional data of the at least one damaged area based on the compared grid numbers;
map, based on the additional data captured from the plurality of lasers, a depth of damage to the at least one damaged area and identify, based on the mapping, a type of damage to the at least one damaged area;
access a second database storing repair cost information for other vehicles similar to the insured vehicle that have similar damage to the insured vehicle;
determine a confidence factor for the repair cost information based on a similarity between the other vehicles and the insured vehicle; and
using the repair cost information, the depth of damage and type of damage, and the confidence factor, generate a cost estimate for repairing the at least one damaged area of the insured vehicle and a list of service providers for performing the repair.

22. The apparatus of claim 21, wherein the apparatus is further caused to: generate a payment for compensating a claimant associated with the insured vehicle for a cost of the repair.

23. The apparatus of claim 21, wherein the cost estimate is generated less than 30 minutes after the plurality of cameras are directed to generate images.

24. The apparatus of claim 21, wherein the apparatus is further caused to receive, through an input communication module, a notice of loss associated with the insured vehicle.

25. A vehicle damage assessment system comprising:
a plurality of cameras, including:
a first camera configured to create at least an image of a first portion of a damaged vehicle, and
a second camera configured to create at least an image of a second portion of the damaged vehicle;
a plurality of lasers, including:
a first laser configured to image at least a first part of a first damaged area of the first portion of the damaged vehicle, and
a second laser configured to image at least a second part of a second damaged area of the second portion of the damaged vehicle;
an input entry portal comprising at least one of a graphic user interface, a keypad and a mouse;
a camera processor in communication with the plurality of cameras and configured to direct the plurality of cameras to image the first portion of the damaged vehicle and the second portion of the damaged vehicle;
a laser processor in communication with the plurality of lasers and configured to direct the plurality of lasers to image the first part of the first damaged area of the first portion of the damaged vehicle and the second part of the second damaged area of the second portion of the damaged vehicle, the directing the plurality of lasers including:
identifying a location of at least one damaged area by:
overlaying a first grid on at least one captured image of the insured vehicle and a second grid on a reference image; and comparing grid numbers of the at least one damaged area on the first grid to the second grid; and directing the plurality of lasers to capture additional data of the at least one damaged area based on the compared grid numbers;

the laser processor further configured to capture additional data including raw depth data to map, based on the additional data captured from the plurality of lasers, a depth of damage to the first portion of the damaged vehicle and the second portion of the damaged vehicle and identify, based on the mapping, a type of damage to the first portion of the damaged vehicle and a type of damage to the second portion of the damaged vehicle;

a claims processor configured to:

receive at least a first reference image to an undamaged first portion of a reference vehicle that is undamaged and otherwise similar to the first portion of the damaged vehicle;

receive at least a second reference image to an undamaged second portion of a reference vehicle that is undamaged and otherwise similar to the second portion of the damaged vehicle;

compare the at least a first reference image of the undamaged first portion of the reference vehicle to the image of the first portion of the damaged vehicle, receive information regarding the image from the first laser of the at least the first part of the first damaged area of the first portion of the damaged vehicle, determine a first severity of damage to the first portion of the damaged vehicle, compare the at least a second reference image of the undamaged second portion of the reference vehicle to the image of the second portion of the damaged vehicle, receive information regarding the image from the second laser of the at least the second part of the second damaged area of the second portion of the damaged vehicle, determine a second severity of damage to the second portion of the damaged vehicle, determine cost estimate information for repair of the first portion of the damaged vehicle and repair of the second portion of the damaged vehicle based on a confidence factor incorporating a similarity between the reference vehicle and the damaged vehicle;

a data store that includes information regarding a cost to repair the first portion of the reference vehicle and a cost to repair the second portion of the reference vehicle;

a graphic user interface configured to display the cost estimate information;

a payment processor configured to determine a payment based at least in part on the cost estimate information; and a payment transfer processor configured to direct the payment to a customer associated with the damaged vehicle.

26. A claims processing system comprising:

an input module configured to receive loss information related to an insured item;

a claims processor configured to:

direct a camera processor associated with a plurality of cameras to image the insured item from a first side of the insured item and from a second side of the insured item; and determine at least one damaged area of the insured item based on a comparison of images from the first side and second side;

the claims processor further configured to direct a laser processor associated with a plurality of lasers to capture additional data by:

identifying a location of the at least one damaged area by:

overlaying a first grid on at least one captured image of the insured item and a second grid on the reference image; and comparing grid numbers of the at least one damaged area on the first grid to the second grid; and directing the plurality of lasers to capture the additional data of the at least one damaged area based on the compared grid numbers;

the captured additional data including raw depth data to map a depth of damage to the at least one damaged area and, based on the mapping, identify a type of damage to the at least one damaged area; and the plurality of lasers configured to communicate with the laser processor to map the depth of damage to the at least one damaged area.

* * * * *